Figure 1:
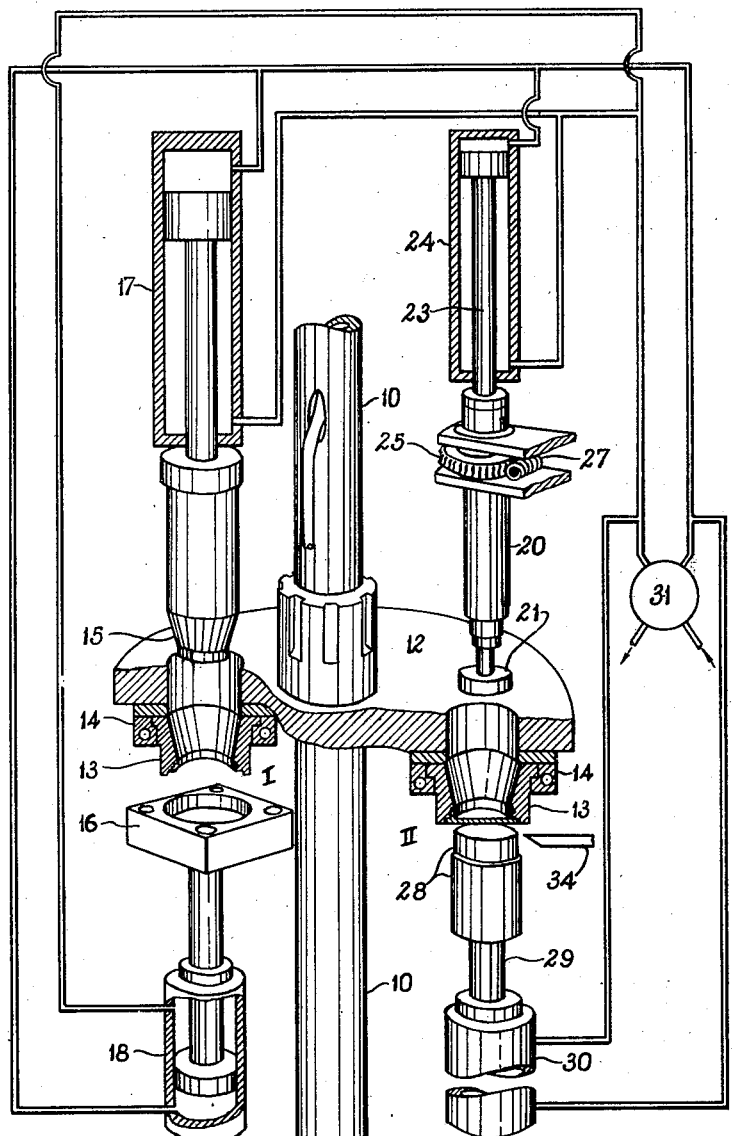

Sept. 25, 1951   N. FIENBERG ET AL   2,568,956
FINISHING APPARATUS FOR PLASTIC MOLDINGS
Filed July 24, 1950   4 Sheets-Sheet 1

Inventors
N. Fienberg
A. R. Calder
By Stewart Downing Nichols
Attys.

Sept. 25, 1951  N. FIENBERG ET AL  2,568,956
FINISHING APPARATUS FOR PLASTIC MOLDINGS
Filed July 24, 1950  4 Sheets-Sheet 3

Inventors
N. Fienberg
A. R. Calder
By Stewart Downing Reibold
Attys.

Sept. 25, 1951   N. FIENBERG ET AL   2,568,956
FINISHING APPARATUS FOR PLASTIC MOLDINGS
Filed July 24, 1950   4 Sheets-Sheet 4
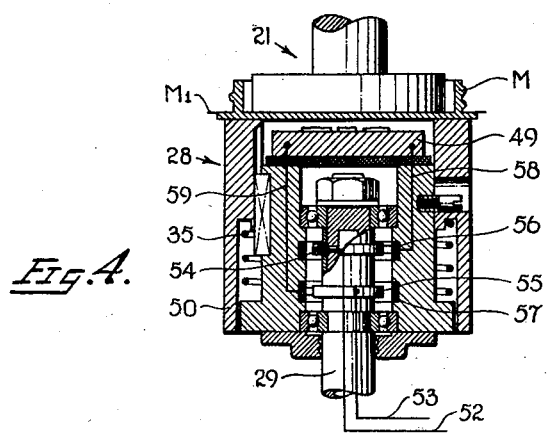
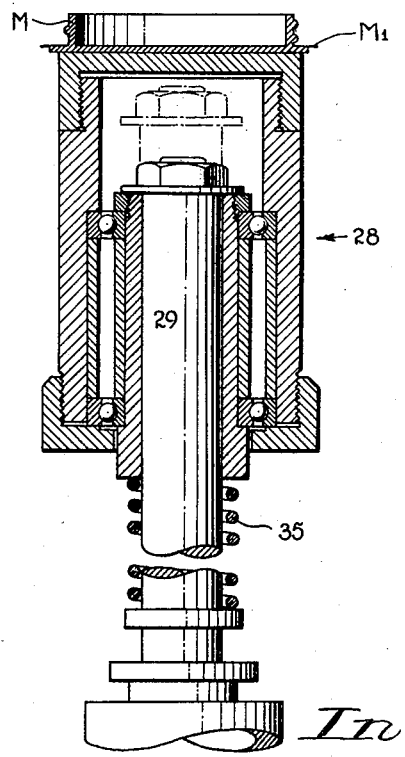

Patented Sept. 25, 1951

2,568,956

UNITED STATES PATENT OFFICE 2,568,956

FINISHING APPARATUS FOR PLASTIC MOLDINGS

Nathan Fienberg, Caulfield, Victoria, and Alan Reginald Calder, Newport, Victoria, Australia, assignors to A. C. I. Plastics Proprietary Limited, Melbourne, Victoria, Australia, a company Application July 24, 1950, Serial No. 175,634
In Australia July 25, 1949

18 Claims. (Cl. 18—20)

This invention relates to the finishing of articles moulded from thermoplastic or thermosetting material.

Such articles, when discharged from the mould, usually have a projecting fin or "flash" which is formed by the penetration of joints in the mould by the plastic material and which it is necessary to remove. The operation of removing such flash is usually effected manually.

Likewise, after an article has been moulded, it is frequently necessary to fill with coloured wax or the like, grooves which have been moulded therein, to form ornamented designs, words, monograms or the like. In other cases words or designs are formed on the articles by pressing gold leaf or other material thereinto by means of heated dies.

The aforesaid finishing operations are generally either performed manually or their performance involves an excessive amount of manual work or handling.

Accordingly, the general object of the present invention is to provide improved means for use in performing finishing operations on moulded articles, such finishing means being preferably either incorporated in or operatively associated with a machine for moulding the said articles.

The invention broadly resides in apparatus for performing finishing operations on moulded articles comprising a coaxially aligned pair of holding members, means operable to actuate one at least of said holding members to clamp a moulded article therebetween, means operable to displace said holding means and interposed moulded article axially in unison and finishing means arranged to engage said moulded article during said axial displacement thereof.

Preferably means are provided for rotating the moulded article during the axial displacement thereof.

The said finishing means may comprise means for removing fin or flash from the moulded article and/or means for filling, coloring or embossing same.

Preferably one of said holding members is arranged to be rotated and displaced axially by suitable means, while the other of said holding means is preferably freely rotatable and is yieldingly urged towards the coacting holding member by resilient or other suitable means, whereby said freely rotatable holding member and the intervening moulded article are rotated and axially displaced by said firstmentioned holding member.

Figure 2:
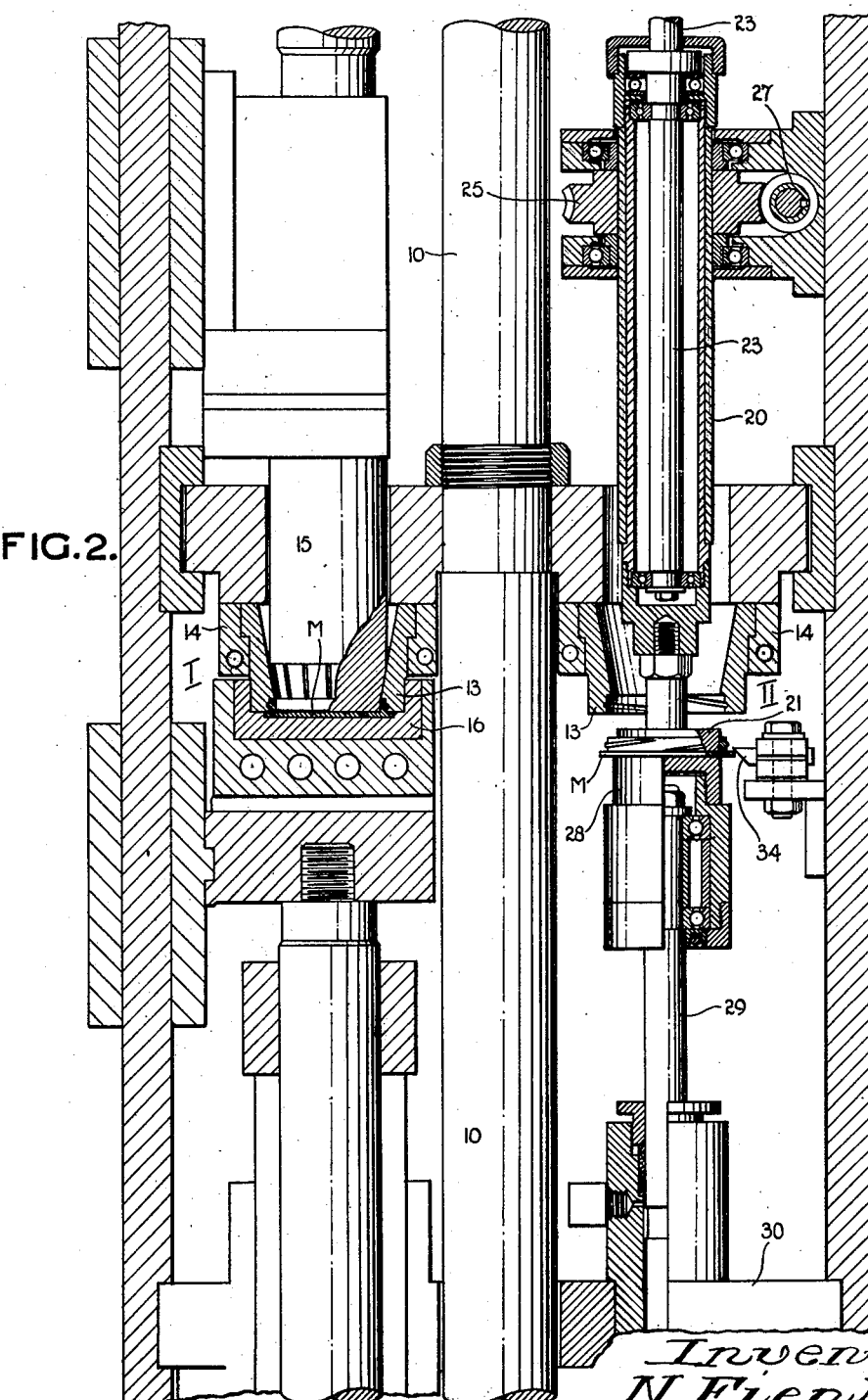
Figure 3:
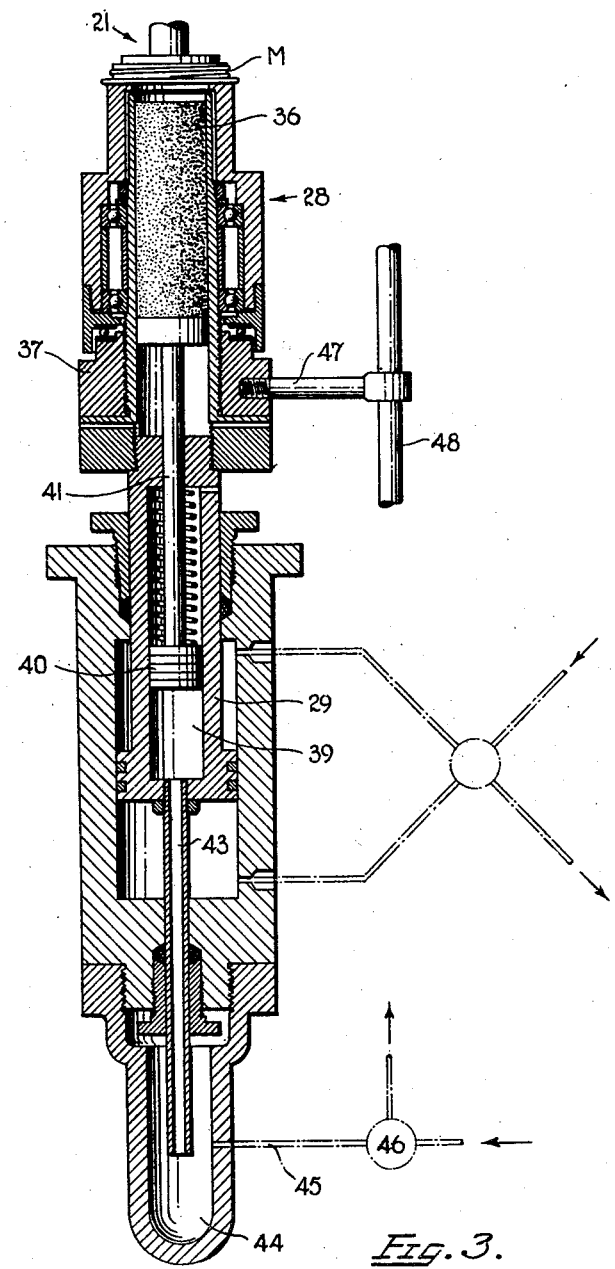

For a more particular description of preferred forms of the invention, reference will be made to the accompanying drawings in which:

Figure 1 is a view in perspective of a portion of a plastic moulding machine incorporating finishing means, Figure 2 is a view in sectional elevation through the moulds of the machine, Figure 3 is a view in sectional elevation showing wax filling means, Figure 4 is a view similar to Figure 3 and shows means for impressing the moulded articles with a heated die, and Figure 5 is a sectional view similar to Figure 4 and shows a further modification.

The moulding machine of which a portion only is shown in the drawings comprises a vertical semi-rotary spindle 10 mounted in suitable bearings and which when the machine is operating is moved forwardly and rearwardly through angles of 180° by rack and pinion mechanism 11.

The spindle 10 is provided near its upper end with a carrier disc 12 formed with a diametrically opposed pair of openings and a ring mould 13 is arranged centrally below each such opening and is secured to the disc by a corresponding bolster 14.

Thus by operation of the spindle 10, the ring moulds 13 are alternately located at a moulding station designated I and when either mould is disposed in that position, the other mould is located at a take-out and finishing station II.

The mould 13 for the same being positioned at the moulding station co-operates with coaxially aligned and vertically movable upper and lower moulding members 14 and 16 respectively, the former of which constitutes a plug which operatively engages the ring mould to form the male member of the mould, while the lower member 16 constitutes the female member of the mould.

The mould members 15 and 16 are connected to plungers which operate in double-acting hydraulic cylinders 17 and 18 respectively and the supply of pressure fluid to such cylinders is suitably controlled so that said mould members move in unison towards and from the coacting intermediate mould member 13.

The mould is shown in the closed condition in Figure 1 and the illustrated moulded article M is an externally screw-threaded cap.

The construction of the mould is such that when the mould is opened the article M is retained by the screw-thread or other suitable formation to the ring mould 13 and so is carried by the latter to the take-out station II during the next succeeding movement of the spindle 10.

An axially movable and rotatable spindle 20 is arranged vertically at the take-out station and same is provided at its lower end with a detachable headpiece 21 of such size that it is capable of passing completely through the ring mould 13 to engage the upper surface of the moulded article therein.

In the illustrated construction this spindle 20 is rotatively supported on a plunger rod 23 having its upper end secured to a plunger which operates in a double-acting hydraulic cylinder 24.

Thus by alternately supplying oil under pressure to the opposite ends of this cylinder the spindle 20 may be raised and lowered.

When the spindle occupies its normal raised position, the headpiece 21 on the lower end thereof is disposed clear of the disc 12 so that the latter is free to turn.

The spindle 20 is also required to rotate either continuously or intermittently and this may be conveniently accomplished as shown in drawings by providing same with a worm wheel 25 through which said spindle may slide but relative angular movements are prevented by a key 26.

The worm wheel is engaged by a worm 27 which is operated when required by a fluid motor or in any other convenient manner.

A rotatable support 28 for the moulded articles is arranged coaxially below the headpiece 21 at the take-out station and when same occupies its normal retracted position, its upper surface is disposed below the plane of rotation of the lower ends of the ring moulds 13.

This support 28 is rotatively mounted on a plunger rod 29 provided at its lower end with a plunger which operates in a double-acting hydraulic cylinder 30, the diameter of this cylinder 30 being less than that of the upper cylinder 24.

The apparatus includes suitable valve means for supplying oil under pressure simultaneously to the outer ends of the cylinders 17, 18, 24 and 30 while the opposite ends thereof are connected to exhaust, one suitable type of valve 31 and the connections therefor being diagrammatically illustrated in Figure 1.

After each actuation of the carrier disc, the valve 31 is actuated to project simultaneously, the plungers in said cylinders 17, 18, 24 and 30 and the former vertically aligned pair thus operate to close together, the three coaxially aligned members of the final mould to form a further article M.

The projection of the plunger in cylinder 24 causes the headpiece 21 to descend through the coaxially aligned opening in the carrier disc and through the corresponding ring mould 13 into engagement with the upper surface of the moulded article M as clearly shown in Figure 2, while simultaneously the plunger in the cylinder 24 raises the rotatable member 28 into engagement with the lower surface of the moulding.

As previously explained the headpiece 21 may be rotated continuously by means of the worm and worm heel gearing 27, 25, while in the alternative such gearing is actuated only while the headpiece is descending. In either case the direction of rotation is that required to unscrew the moulding M from the ring mould 13.

The speed of the approaching movements of the headpiece 21 and the rotary support 28 are such that same substantially simultaneously engage the opposite sides of the moulding, so that the latter is clamped therebetween with sufficient pressure to cause same to be unscrewed from the ring mould.

As the cylinder 24 is somewhat larger in diameter than the cylinder 30, the rotary support is forced downwards by the headpiece 21 and interposed moulding M in opposition to the pressure of the oil in the cylinder 30, it being understood that the pressure of the moulding on the support 28 causes the latter to rotate in unison with the moulding.

After the moulding has been unscrewed from the ring mould, it continues its rotating and downward movements, whereby the fin or flash M on the peripheral edge thereof is engaged by a cutting tool 34, which may be disposed in a fixed position as shown or which may be moved automatically inwards to engage the moulding M as the latter descends, according to requirements.

In a modification of the invention (which is not illustrated) the spindle 20 carrying the headpiece 21 may be constrained to descend through a distance equal to the pitch of the screw thread on the moulding during each revolution of such spindle. For example, the spindle may be formed with a screw thread of the same pitch as the moulding, such screw thread being engaged by a fixed nut, while the spindle may be rotated by rack and pinion or other suitable mechanism operable by the plunger of a hydraulic cylinder.

At the conclusion of the operation the valve 31 is again operated so that the respective plungers of the several hydraulic cylinders are retracted in preparation for a further operation of the mould carrying disc 13.

Accordingly, at the termination of the operation at the finishing station the moulded article M remains resting upon the upper surface of the rotatable support 28 from which it may readily be delivered by means (not shown) into a discharge chute or the like.

Thus at each operation a moulded article from which the peripheral flash has been removed is delivered by the machine, so that the usual subsequent manual de-finning operation is eliminated with considerable resultant economies.

While the invention is especially applicable to caps, closures and containers and the like, it is capable of other useful applications also.

If desired, and as shown in Figure 5 of the drawings, the rotatable support 28 may be resiliently supported by means of a spring 35 on the plunger rod 29 so that same may be pressed downwardly in opposition to such spring by the headpiece 21.

Figure 3 shows one form of mechanism for applying a wax or other like filling to the lower surface of the moulding M during the take-out and definning operations.

In this construction a stick 36 of wax or other filling material is slidably supported in a tubular holder 37 which forms an upward extension of the plunger rod 29 and the rotary support 28 is mounted on the said holder and is provided in its upper end with a central hole through which the stick 36 may project.

The plunger rod 29 is hollow to form a central cylinder 39 for a slidable plunger 40 fitted with an upwardly extending rod 41 provided at its upper end with a base cup for the stick 36.

The plunger 40 is urged downwards by a spring while a slidable tube 43 connects the lower end of the cylinder 39 to a chamber 44 which is connected by a pipe 45 to a valve 46 by operation of which oil may be supplied to or discharged from the cylinder 39.

The holder 37 is restrained against rotation by a radially projecting arm 47 which is forked at its outer end to engage a guide rod 48 suitably supported on the frame of the machine.

When the rotary support 28 occupies its normal retracted position, the filling stick 36 is also retracted so that its upper end is disposed below the level of the top of said support.

In operation therefore the moulding M is unscrewed in the manner already described.

While the cap is descending and rotating, however, oil under pressure is supplied through the valve 46 to the internal cylinder 39, whereby the non-rotating wax stock 36 is moved upwards and pressed into contact with the lower surface of the rotating cap, so that indentations formed therein are filled.

Before the upper headpiece 21 commences its upward movement to disengage the moulding M, the valve 46 is again operated to connect the cylinder 39 to exhaust thereby obviating displacement of the moulding by the further projection of the wax stick.

Figure 4 shows one form of apparatus for impressing the lower surface of the moulding M, during the take-out operation, with a die 49.

In this construction the rotary support 28 comprises a sleeve which is slidably but non-rotatively mounted on a hub 50 which in turn is rotatively supported on the plunger rod 29 and the die 49 is detachably supported centrally on the upper end of this hub.

The sleeve 28 is urged upwardly by a spring 36 whereby the upper end of the former is normally disposed above the level of the top of the die.

Thus the operation of removing the moulding M from the ring mould 13 is effected as already described by clamping same between the rotating headpiece 21 and the upper end of the sleeve 28 which, together with the hub 50, is rotated by the frictional engagement between the moulding and the sleeve.

As the moulding is pressed downwards by the headpiece, the sleeve 28 is correspondingly moved downwards in opposition to the spring 35 until the die 49 is pressed firmly into the lower surface of the moulding, it being understood that the die is previously rotating at the same speed as the moulding. This die 49 may be utilised to impress gold-leaf or the like with the moulding, in which case such material is supplied either by hand, or by mechanism not forming a part of this invention, to the die prior to each operation.

When it is necessary or desirable to heat the die 49, this may be accomplished in any convenient manner and one arrangement whereby same may be heated electrically is shown in the drawing wherein conductors 52 and 53 extend upwardly through the non-rotatable plunger rod 29 to insulated contact rings 54 and 55 respectively which are engaged by insulated resilient contact strips 56 and 57 on the rotating hub and these contact strips are connected by conductors 58 and 59 to the die.

It will, however, be evident that various other modifications may readily be effected to meet the particular requirements of other finishing operations.

We claim:

1. Apparatus for performing finishing operations on moulded articles comprising a coaxially arranged pair of holding members, a tubular member for supporting a moulded article at or near the outer edge thereof with the axis of said tubular member disposed substantially coaxially with said holding members, means for imparting axial and rotary movement to said holding members whereby said article may be clamped between the holding members and separated from said tubular supporting member and finishing means arranged to engage the moulded article during the axial displacement thereof.

2. Apparatus for performing finishing operations on moulded articles comprising a spaced coaxially arranged pair of holding members, a tubular member open at its opposite ends and adapted to support a moulded article at or near the outer edge of the latter, with the axis of said tubular member substantially coincident with the common axis of said holding members, means operable to displace said holding members axially, means operable to rotate said holding members whereby the moulded article may be clamped between said holding members and the latter may then be displaced axially and simultaneously rotated and finishing means arranged to engage the moulded article as same is being displaced axially by said holding means, one of said holding means being capable of passing completely through the tubular member.

3. Apparatus for performing finishing operations on moulded articles comprising a spaced coaxially arranged pair of holding members, a tubular member open at its opposite ends and adapted to support a moulded article at or near the outer edge of the latter, with the axis of said tubular member substantially coinciding with the common axis of said holding members, means operable to displace said holding members axially whereby same may be moved towards each other to clamp the moulded article therebetween and then moved in unison in the same direction to separate such article from the tubular member, finishing means arranged to engage the article during the axial displacement thereof and means operable to cause the said article to rotate relatively to said finishing means while same is operatively engaged by the latter.

4. Apparatus according to claim 3 including a carrier supporting said tubular member and means operable in timed relation with said holding means to actuate the carrier intermittently whereby said tubular member is successively moved into and out of register with said holding members.

5. Apparatus for performing finishing operations on moulded articles comprising an intermittently movable carrier, a tubular member supported on said carrier, said tubular member being open at its opposite ends and adapted to support a moulded article at or near the outer edge of the latter, means operable to actuate said carrier whereby same is periodically moved to and arrested at a take-out station, a spaced coaxially aligned pair of axially movable holding members arranged at the take-out station, said tubular member when located at the take-out station being disposed coaxially between said holding members, means operable to move said holding members axially towards each other whereby the moulded article is clamped therebetween, means operable subsequently to move said holding members and interposed article in the same axial direction whereby the article is removed from the tubular member and finishing means arranged to engage the moulded article while same is clamped between said holding means.

6. Apparatus according to claim 5 wherein said tubular member forms an element of a mould in which the article is formed and is shaped to form a screw-thread in the article and including means operable to rotate said holding members while the article is clamped therebetween and moved axially thereby, whereby said article is unscrewed from the tubular member.

7. Apparatus according to claim 5 including means operable to rotate said holding members, while the article is clamped therebetween and moved axially thereby and wherein said finishing means comprises a cutting tool arranged to remove flash or fin from the article while same is being rotated and moved axially.

8. Apparatus according to claim 5 wherein said finishing means comprises means arranged within one of said holding members for inserting wax or other filling material into depressions or the like formed in the moulded article.

9. Apparatus according to claim 5 wherein said finishing means comprises an impressing die arranged within one of said holding members and including means operable to press the die against the moulded article.

10. Apparatus for performing finishing operations on moulded articles comprising a spaced pair of rotary holding members arranged substantially in vertical coaxial alignment, means operable to displace said holding members axially whereby same may be moved towards each other to clamp therebetween an interposed moulded article and may then be moved together with such article in the same direction, means operable to rotate one of said holding members whereby the other holding member and the interposed article are rotated in unison therewith and finishing means arranged to engage said moulded article as same is being displaced axially and rotated by said holding means.

11. Apparatus according to claim 10 including an intermittently movable carrier, at least one tubular mould member mounted on said carrier, said tubular member being open at both ends and adapted to support a moulded article, means operable when said holding members are retracted to actuate the carrier whereby said tubular member is moved into and out of the space between said holding members, said tubular member when arranged between said holding members being disposed in coaxial alignment therewith and means operable to form said moulded article on the tubular member when same is disposed out of register with the holding members, one of said holding members being of such size that it may pass completely through the tubular member.

12. Apparatus for performing finishing operations on moulded articles comprising a carrier supported for angular movements about a substantially vertical axis, at least one tubular mould member supported by said carrier with its axis disposed substantially vertically, means operable to actuate said carrier intermittently whereby the tubular carrier is successively moved to and arrested at spaced moulding and take-out stations, means operable at the moulding station to mould an article onto said tubular member, a spaced substantially vertically aligned pair of rotary holding members arranged at the take-out station whereby when said tubular member is arrested at such station, it is disposed coaxially between said holding members means operable while the tubular holder is arranged at the take-out station to move said holding members axially towards each other to clamp therebetween a moulded article carried by said tubular member and then to move said holding members and interposed article in the same axial direction, means operable to rotate said holding members and interposed article during the axial displacement of the latter and finishing means arranged to engage said moulded article as same is being displaced axially and rotated by said holding means.

13. Apparatus according to claim 12 wherein said means for displacing the holding members axially comprise fluid pressure cylinders and valve means are provided for causing said holding members to be projected and retracted in unison.

14. Apparatus according to claim 12 including resilient means interposed between one of said holding members and said operating means therefor whereby such holding member may be moved axially in opposition to such resilient means by the pressure imparted thereto by the other of said holding means.

15. Apparatus for performing finishing operations on moulded articles comprising a carrier supported for angular movements about a substantially vertical axis, at least one tubular mould member supported by said carrier with its axis disposed substantially vertically, means operable to actuate said carrier intermittently whereby the tubular carrier is successively moved to and arrested at spaced moulding and take-out stations, means operable at the moulding station to mould an article onto said tubular member, a spaced substantially vertically aligned pair of rotary holding members arranged at the take-out station whereby when said tubular member is arrested at such station, it is disposed coaxially between said holding members, means operable while the tubular holder is arranged at the take-out station to move said holding members axially towards each other to clamp therebetween a moulded article carried by said tubular member and then to move said holding members and interposed article in the same axial direction, means operable to rotate said holding members and interposed article during the axial displacement of the latter and a cutting tool arranged to engage the peripheral portion of the moulded article to remove flash or fin therefrom as same is being displaced axially and rotated by said holding means.

16. Apparatus for performing finishing operations on moulded articles comprising a carrier supported for angular movements about a substantially vertical axis, at least one tubular mould member supported by said carrier with its axis disposed substantially vertically, means operable to actuate said carrier intermittently whereby the tubular carrier is successively moved to and arrested at spaced moulding and take-out stations, means operable at the moulding station to mould an article onto said tubular member, a spaced substantially vertically aligned pair of rotary holding members arranged at the take-out station whereby when said tubular member is arrested at such station, it is disposed coaxially between said holding members, means operable while the tubular holder is arranged at the take-out station to move said holding members axially towards each other to clamp therebetween a moulded article carried by said tubular member and then to move said holding members and interposed article in the same axial direction, means operable to rotate said holding members and interposed article during the axial displacement of the latter, means arranged within one of said holding members for supporting a stick of filling material, means restraining said stick holding means against rotation in unison with said holding means and means for axially displacing said stick holding means, so that the outer end portion of the filling material is pressed into contact with the adjacent surface of the molded article.

17. Apparatus for performing finishing operations on moulded articles comprising a carrier supported for angular movements about a substantially vertical axis, at least one tubular mould member supported by said carrier with its axis disposed substantially vertically, means operable to actuate said carrier intermittently whereby the tubular carrier is successively moved to and arrested at spaced moulding and take-out stations, means operable at the moulding station to mould an article onto said tubular member, a spaced substantially vertically aligned pair of rotary holding members arranged at the take-out station whereby when said tubular member is arrested at such station, it is disposed coaxially between said holding members, means operable while the tubular holder is arranged at the take-out station to move said holding members axially towards each other to clamp therebetween a moulded article carried by said tubular member and then to move said holding members and interposed article in the same axial direction, means operable to rotate said holding members and interposed article during the axial displacement of the latter and means arranged within the operative end of one of said holding members for supporting a die for impressing the adjacent surface of the moulded article.

18. Apparatus according to claim 17 wherein the operative end of said die is normally retracted from the operative end of the enclosing holding member and including means operable to press said die into contact with the moulded article during the axial movement of the latter.

NATHAN FIENBERG.
ALAN REGINALD CALDER.

REFERENCES CITED

The following references are of record in the file of this patent:

UNITED STATES PATENTS

| Number | Name | Date |
| --- | --- | --- |
| 1,738,097 | Cooper | Dec. 3, 1929 |
| 1,880,858 | Davis | Oct. 4, 1932 |